Inventor
C. O. Bull
By Glascock Downing Fiehld
Attys

Dec. 26, 1950 C. O. BULL 2,535,264
WHEELBARROW WITH WEIGHING MEANS
Filed Sept. 24, 1945 5 Sheets-Sheet 2
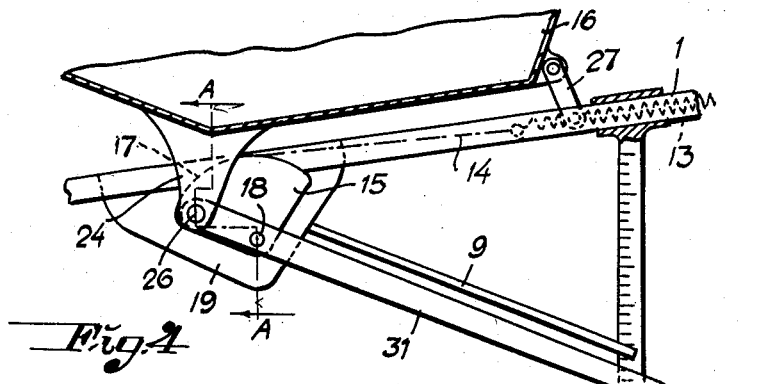
Fig.4
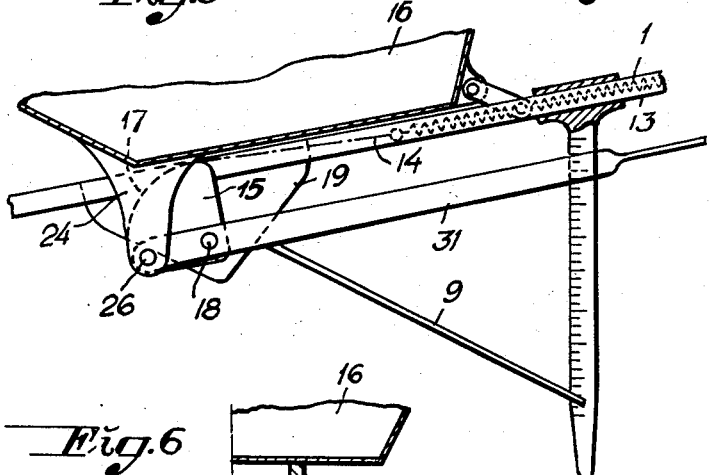
Fig.5
Fig.11
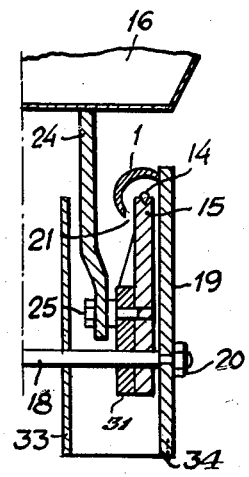
Fig.6
Fig.12
Inventor
C. O. Bull
By Stewart Downing Seitz
Attys Dec. 26, 1950    C. O. BULL    2,535,264
WHEELBARROW WITH WEIGHING MEANS
Filed Sept. 24, 1945    5 Sheets-Sheet 3

Inventor
C. O. Bull
By Glaser & Downing Seely
Attys

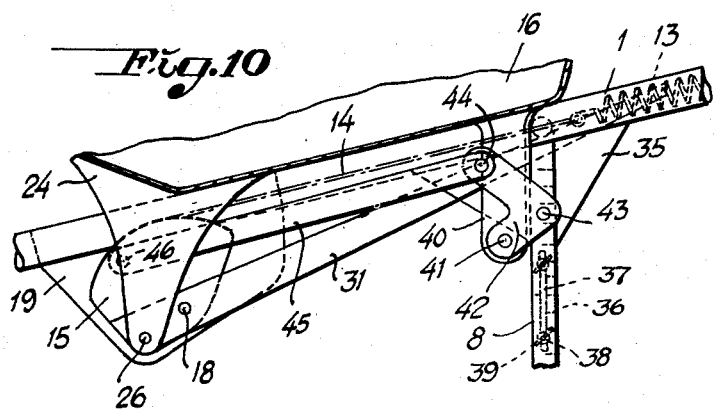

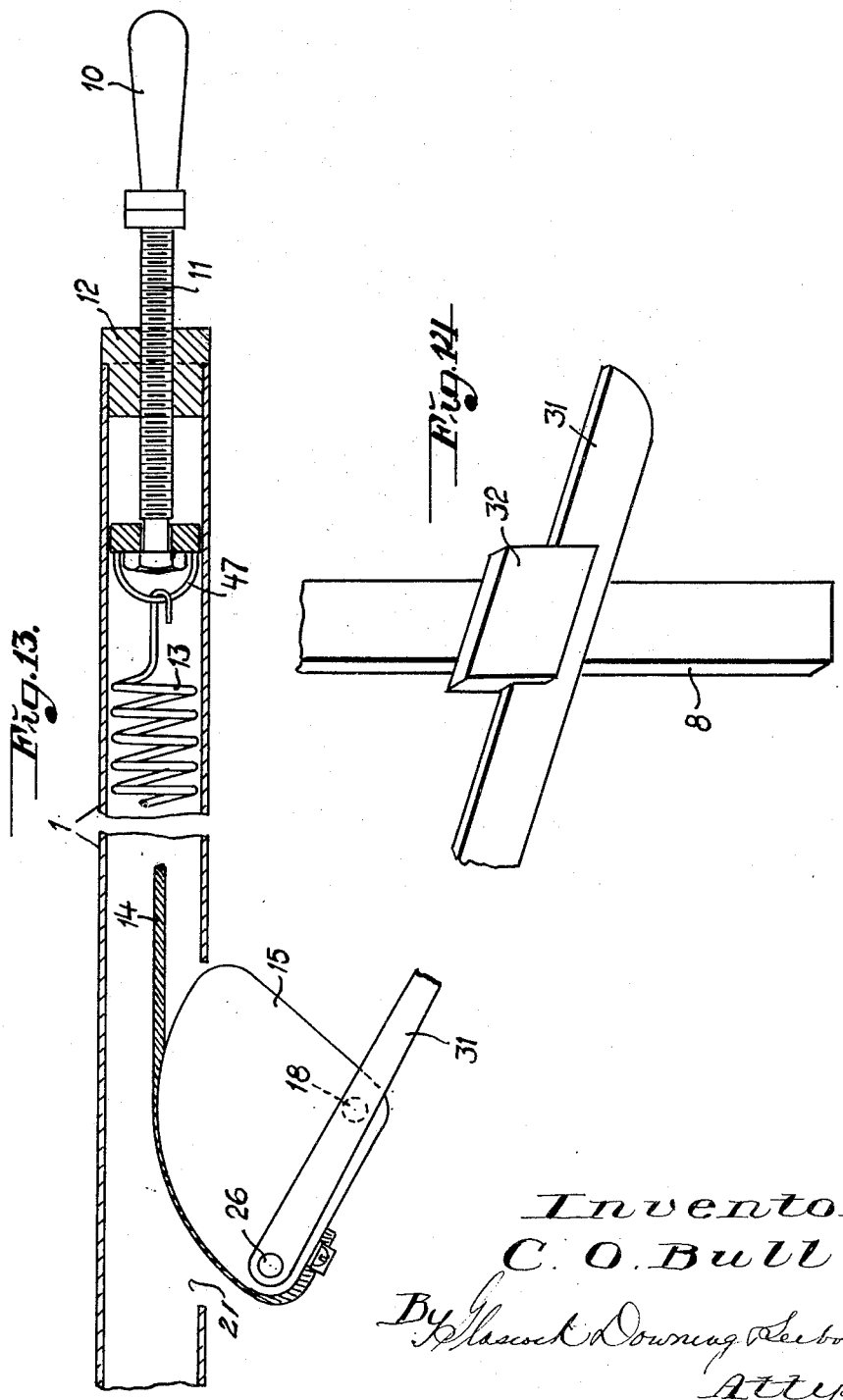

UNITED STATES PATENT OFFICE 2,535,264

WHEELBARROW WITH WEIGHING MEANS

Carl Ove Bull, Ulvsunda, Sweden, assignor to Fastighetsaktiebolaget Lubo, Borås, Sweden, a corporation of Sweden Application September 24, 1945, Serial No. 618,125
In Sweden September 27, 1944

8 Claims. (Cl. 265—42)

It is known to combine two-wheeled packhouse carts and the like with weighing devices so as to permit the weight of the load to be read off when the cart is loaded. The frames of the two-wheeled hand-carts, as of the four-wheeled trucks, offer, because of their width, and above all because of their uniform width, great facilities of arranging thereon various spring-loaded leverages for a weighing mechanism combined with the platform of the cart or truck.

Thus one would arrange underneath the platform of a two-wheeled hand-cart, for example, transverse multi-armed levers adapted to be actuated by the platform as well as by counteracting springs while being connected to the operating spindle of a pointer device in such manner that the latter would be caused to make a deflection at the turning of the levers in the loading of the platform. According to another proposal, one would endeavour in vain to provide a construction adapted independently of the inclination of a two-wheeled pack-house cart to actuate the spring-balance with the same force, the platform having been suspended in four pivotally mounted circular sector segments connected with the pointer of the weighing mechanism over leverages and gear wheels, the platform having been suspended on said segments by means of flexible bands laid about the sector arcs.

These known weighing contrivances are not suited for barrows, however. In the first place, they comprise so many parts as to make the barrow too heavy, and, furthermore, the parts call for large frames of a uniform width and could not be accommodated within the limited space available on the tapering short frame of a wheelbarrow; furthermore, the known construction of balances does not offer any stability, particularly at tilting sideways in accordance with frequent practice in wheel-barrows. Also, the weighing means have no arresting facilities, so that the platform is caused to oscillate up and down during work when loaded, which circumstance excludes the use of the weighing devices in barrows which themselves have an unstable position of equilibrium during work, the reading of the weight also becoming less accurate in the known constructions.

Now, the present invention aims at providing a weighing mechanism intended to be combined with a wheel-barrow and which does not suffer from the said drawbacks. It is of small weight and does not influence the stability of the cart in using the latter, inasmuch as the weighing mechanism is combined with a special pedal which, in addition to making a deflection relatively to a graduated scale like a pointer so as to indicate the weight of the measured load on said scale, also functions as an arresting means, it being possible by depressing the pedal into the starting or zero position and by locking the pedal in this position, to arrest the whole of the weighing mechanism, so that the platform will be rigidly connected with the remainder of the barrow, which becomes readily operable in its entirety. The pointer pedal is secured to pivoted suspension elements for the platform and is constructed so that a small turning movement of said elements entails a great deflection on the graduated scale with accuracy in the reading of the weight in consequence thereto. Furthermore, the invention refers to special constructions of the pivoted suspension elements of the platform, said elements also guiding the pointer pedal, and also refers to special constructions of the rear attaching means for attaching the platform to the frame. These attaching means may be constituted by links or hinge members supporting the platform against forward tilting over the pivoted elements and against sideways tilting at any inclination of the cart. The attaching means may also consist of a leverage constituted by a pair of supporting arms secured each per se to the one arm of two two-armed levers pivotally mounted in the frame, the other arm of which is connected to the pivoted elements carrying the central portion of the platform so as to be positively guided thereby. The latter arrangement obviates or at least considerably reduces the oscillatory movement of the platform about the rear attaching means, while the proper distribution of the load on the platform is rendered of less consequence for the reaching of a correct weighing result.

The present invention also comprises regulating means for the weighing device proper to make it easier to control and, if necessary, to regulate the weighing device.

The regulating facilities provided according to the invention reside in that the graduated scale on the legs of the barrow is detachably and displaceably arranged, and in that the springs pertaining to the weighing device have their attachments displaceably arranged on the shaft handles of the barrow.

The various details of the invention and the construction in its entirety will be fully explained in the following with reference to the accompanying drawings, which illustrate a few examples of embodiment of the invention Fig. 1 shows a vertical section of a wheel-barrow fitted with a weighing device according to the invention, the position of the wheel of the unloaded barrow being only indicated in the drawing.

Figs. 4 and 5 show the pointer and arresting pedal to a larger scale and in two different positions, that is to say with the barrow unloaded and loaded, respectively. These two figures, being sections corresponding to Figs. 1 and 2 respectively, also illustrate the members of the weighing device actuating said pedal.

Fig. 6 is a section to a larger scale on line A—A in Fig. 4.

Fig. 10 shows the weighing device according to Fig. 8 on a larger scale.

Figs. 11 and 12 finally represent sections to a larger scale of two different constructions of the grooves in the turning elements of the weighing device.

Fig. 13 is an enlarged fragmentary longitudinal sectional detail of the spring and cable connection between one of the handles and one of the disks, and Fig. 14 is a fragmentary perspective detail of a portion of a leg with catch thereon.

Figure 1:
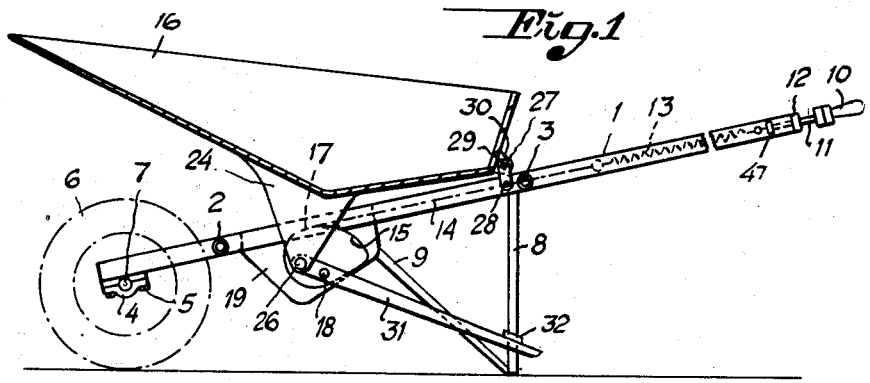
Figure 2:
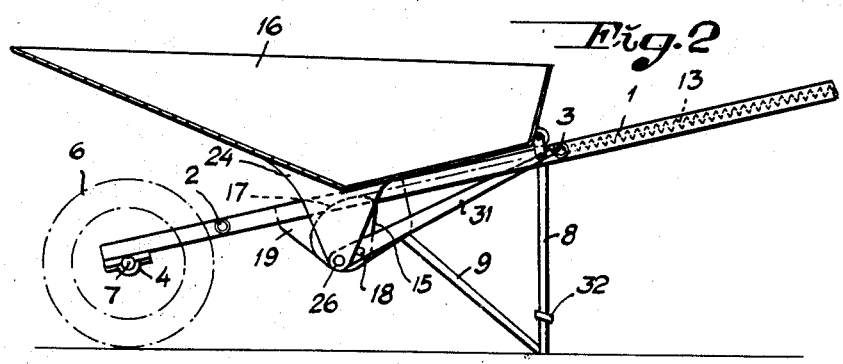
Fig. 2 is a similar vertical section, the barrow being here conceived as loaded with the weighing device in another position in consequence thereto.
Figure 3:
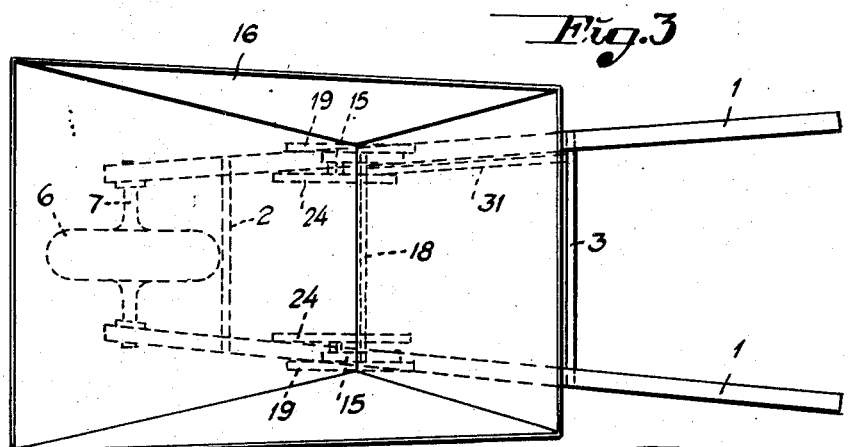
Fig. 3 shows the barrow according to Fig. 1 viewed from above.

The wheel-barrow according to Figs. 1–6 consists of the tubular shafts 1, which together with the cross braces 2, 3 form the frame of the barrow. The front portions of the shafts 1, 1 are provided with bearings 4 secured to the shafts 1 by means of bolts 5. The shaft 7 of the barrow-wheel 6 is mounted in said bearings 4, 4. The frame is also provided with two legs 8, 8, which are braced by means of oblique braces 9. Each shaft 1 is provided with a handle 10, which is screwed by means of a threaded pin 11 into a threaded bushing 12 rigidly secured to the shaft. Provided within the shafts 1, 1 are helical springs 13 having the one end thereof secured to the respective handles 10. The other ends of the springs 13 are connected to wires 14, as will appear from Figs. 1 and 2 and 13, said wires extending to turning elements in the form of cam disks 15 located approximately right beneath the platform or load box 16. The wires are laid about the curved edge 17 of the cam disks, and are secured to the front end of the disks in any suitable manner. The cam disks 15 are welded to a spindle 18 extending crosswise relatively to the frame in parallel to the braces 2, 3 between the two shafts 1, where the spindle 18 is rotatably mounted in holder plates 19 welded to the shafts 1 in the manner illustrated in Fig. 6. The spindle 18 is provided with a stop nut 20 preventing axial movement thereof. The shafts 1, 1 are provided on the lower side thereof with a recess or opening 21, see Fig. 6, said recess permitting the cam disk 15 to enter the tubular shaft to the center thereof.

Figs. 11 and 12 illustrate sections of two different cam disks 15, the disk according to Fig. 11 having a tapered groove 22 to receive the wire 14, while the disk shown in Fig. 12 has a rectangular groove 23. The groove 22 according to Fig. 11 is particularly suitable in the case shown in the drawing where the disks 15 are parallel to each other and thus obliquely located relative to their respective shafts 1.

Depending from the load box 16 are two supporting arms 24, which are mounted each at one of the two cam disks 15 by means of bolts 25 extending through apertures 26 in the supporting arms 24 and having the ends thereof screwed fast in the cam disks 15.

The end of the load box directed toward the shaft handles rests in link irons or hinge members 27, which are pivotally connected with the shafts by means of bolts 28 and pivotally secured by means of bolts 29 to lugs 30 arranged on the outside of the load box. The load box turns with the aid of these members about the bolt 28 when the box is loaded so as to depress the supporting arms 24.

Secured to the one cam disk 15 or, perhaps, to both cam disks is a pointer pedal 31 extending past the legs 8 of the barrow. The legs of the barrow are graduated empirically in correspondence to different loading weights for the load box and proportionately to the spring force of the springs 13; a stop abutment 32 is provided at the lower ends of the barrow legs. In Figs. 4 and 5, the stop abutment is constituted by the brace 9. The pointer pedal 31 may be brought underneath said stop abutments so as to prevent it from passing upwardly by itself. A protective hood 33 is secured by means of screws 34 to the holder plate 19, and has for its object to protect the cam disk and parts cooperating therewith against damage and dirt. The protective hood is omitted in Figs. 1–5. In Figs. 4 and 5, the links 27 take a position somewhat differing from that in Figs. 1 and 2, besides which the former figures also show a somewhat modified construction of the barrow legs and the braces for these legs.

The weighing device functions in the following manner:

When the box of the barrow is loaded, it will be depressed together with the supporting arms 24, the box being thus caused to swing about the links 27, which at the same time prevent the box from tilting forwardly or sideways. The supporting arms 24, which are mounted in the cam disks 15 by means of the bolts 25, are thus turned with and about the spindle 18. This turning movement is counteracted by the springs 13, which are then tensioned by the pull in the wires 14 secured to the cam disks 15. When the cam disks 15 are revolved by the supporting arms 24, the pointer pedal 31, or both pedals, should two of them be brought into use, that is to say one for each cam disk 15, will make a deflection, the end of the pointer pedal then indicating the weight of the load of the barrow by its position relatively to the graduated scale on the adjacent barrow leg.

Weighing having been effected, the pedal is pressed back into its initial or zero-position, for instance by means of the foot. The pedal is thus caused to snap underneath the stop abutment 32 on the barrow leg, whereby the load box becomes rigidly connected with the frame of the barrow and the springs 13 are returned to the initial or zero-position.

As regards the actual indication of the weight, the long pointer pedal according to the invention in comparison with the lever between the points 18 and 26 directly actuated by the load box involves that a very small swinging movement of the lever results in a great deflection of the pointer pedal on the scale, whereby the accuracy of the weight readings is augmented.

The fact that the springs 13 may be kept by the arresting means in a position of rest during transport with the barrow after weighing has been executed, involves the advantage that the life of the springs is increased while the result of the weighing operations is also rendered more satisfactory.

Figure 7:
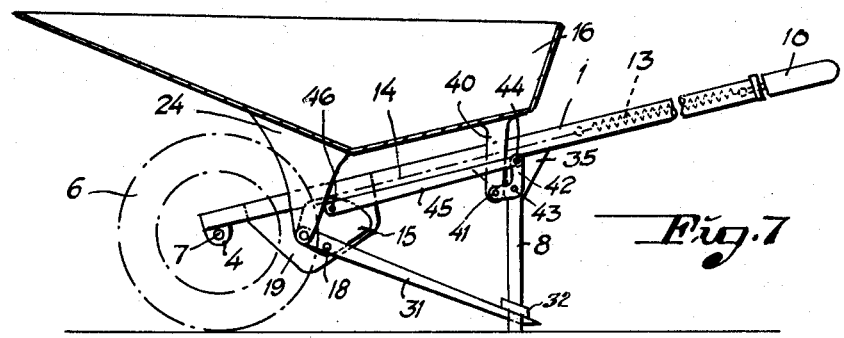
Figs. 7 and 8 are vertical sections of another wheel-barrow with a weighing device of a modified construction, Fig. 7 referring to the unloaded and Fig. 8 to the loaded barrow.
Figure 8:
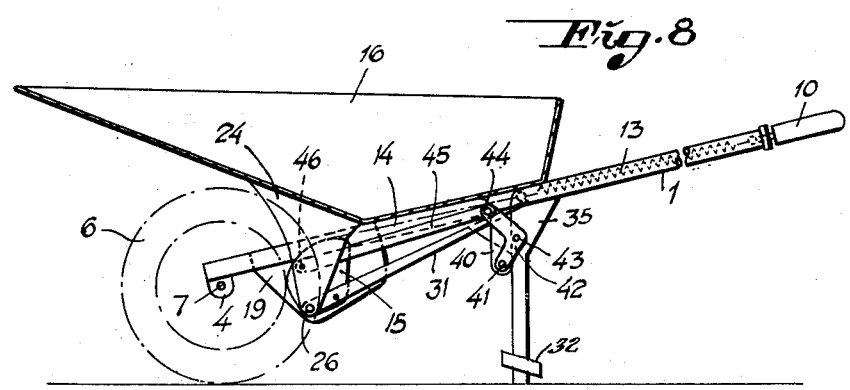
Figure 9:
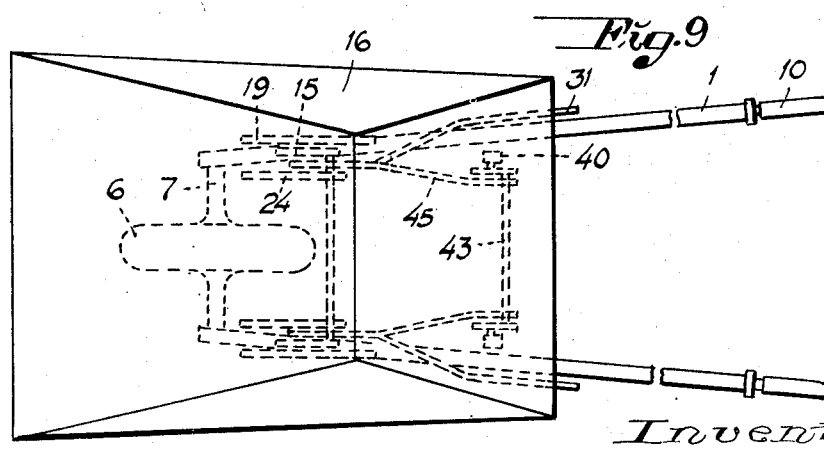
Fig. 9 is a plan view of the barrow according to Fig. 7.

The form of embodiment of the wheel-barrow with its weighing means as disclosed in Figs. 7–10 represents a modification of that described above. The difference between the two constructions refers to the method of supporting the load box at the rear end thereof. The remainder of the construction is substantially similar to that described, and for this reason the same reference numerals have been used throughout for corresponding parts.

In Figs. 7–10, the braces 9 for the legs 8 have been replaced by side plates 35 welded to the legs 8 as well as to the shafts 1. Here, the pointer pedal is bent to a slight S-shape, see Fig. 9, so that the same extends to the outside of the leg 8 to cooperate with a graduated scale on this leg. The graduation of the scale may be applied directly to the leg, as in Figs. 4 and 5, or it may be constructed as in Fig. 10, where the scale is constituted by a special graduated plate 36, which is provided with a slit 37, through which extend two screws 38 projecting from the leg so as to form a guide member for the displacement of the scale along the leg 8. The scale may be locked to the leg in different positions by means of two thumb-nuts 39 cooperating with the screws 38. The load box 16 is provided at the rear end thereof with two depending supporting arms 40, which are pivotally secured by means of through-bolts 41 each to one arm of two bell-cranks 42. The bell-cranks 42 are pivotally arranged on a spindle 43 arranged between the legs of the barrow. The other arms of the bell-cranks 42 are pivotally connected each with the one end of a rod 45 by means of a bolt 44, the other end of said rod being pivotally connected with the cam disk 15 by means of a bolt 46.

When the platform 16 is loaded, it will turn the cam disks 15 and the bell-cranks positively and simultaneously with the aid of the rods 45. By the manner in which the members 40, 42 and 45 are connected, it will be obtained that the platform or load box need not be loaded uniformly or substantially at the center of gravity above the turning elements 15. If the load is supported further rearwards, the action of the weight will in all cases be mediated by the members 40, 42, 45 onto the spring-actuated turning elements 15, the load of the springs 13 being then indicated by the pointer pedal on the scale 36.

The springs 13 may be movably secured to the handles 10 so as to permit of being displaced, when required, with the handles in the longitudinal direction of the shafts in order to regulate the spring force. To this end, the spring is secured in a ring 47, see Fig. 13, which is secured rotatably, but not axially displaceably, to the inner end of the threaded pin 11 of the handle. By turning the handle 10, the spring 13 will thus be strained or slackened.

What I claim is:

1. In combination with a wheel-barrow consisting of a frame provided at one end with a single wheel and at the other end with handles and supporting legs having a graduated scale thereon, and a barrow platform above the frame; a weighing device comprising a pair of spring-controlled elements pivotally mounted in said frame and supporting the platform of the barrow, a pointer arm connected to one of the spring-controlled elements and adapted to indicate the weight of the load on the graduated scale, and arresting means adapted to catch said pointer arm so as to rigidly lock said weighing device including said platform in the zero or initial position.

2. In combination with a wheel-barrow consisting of a frame provided at one end with a single wheel and at the other end with handles and supporting legs having a graduated scale thereon, and a barrow platform above the frame; a weighing device comprising a pair of spring-controlled elements pivotally mounted in said frame and supporting the platform of the barrow, links for securing said platform at the rear thereof to said frame to prevent the platform from forward tilting over said elements or sideways tilting at any inclination of the barrow, a pointer arm connected to one of the spring-controlled elements and adapted to indicate the weight of the load on the graduated scale, and arresting means adapted to catch said pointer arm to rigidly lock said weighing device including said platform in the zero or initial position.

3. In combination with a wheel-barrow consisting of a frame provided at one end with a single wheel and at the other end with handles and supporting legs having a graduated scale thereon, and a barrow platform above the frame; a weighing device comprising a pair of cam disks pivotally mounted in said frame and supporting the principal weight of the platform of the barrow and being arranged approximately right beneath the center of gravity of the platform, springs connected to the handles, wires connected to the springs and laid over the curved edges of said cam disks and secured thereto, a pointer arm secured to one of the disks to indicate the weight of the load on the graduated scale, and arresting means adapted to catch said pointer arm so as to rigidly lock said weighing device including said platform in the zero or initial position.

4. In combination with a wheel-barrow consisting of a frame provided at one end with a single wheel and at the other end with handles and supporting legs having a graduated scale thereon, and a barrow platform above the frame; a weighing device comprising a pair of elements pivotally mounted in said frame and supporting the platform of the barrow and supporting the principal weight of the platform, springs acting on said elements and connected to said frame to counterbalance said weight, a pointer arm operatively connected with at least one of the elements to indicate the weight of the load on the graduated scale, and an arresting member fixed relative to the frame for releasable engagement with the pointer arm so as to rigidly lock said weighing device including said platform in the zero or initial position.

5. In combination with a wheel-barrow consisting of a frame provided at one end with a single wheel and at the other end with handles and supporting legs at least one of which is provided with a graduated scale and a barrow platform above the frame; a weighing device comprising a pair of cam disks pivotally mounted in said frame and supporting the principal weight of a platform for the barrow and being arranged approximately right beneath the center of gravity of the platform, a spring for controlling each of said cam disks being secured with its one end to said frame, and a wire connected to each spring and laid over the curved edge of one of said cam disks and secured thereto, said cam disks being arranged to be mutually parallel, the curved edge of each disk having a groove thereon of a tapered cross section in order to receive and retain said wire, a pointer arm operably connected with at least one of the disks to indicate the weight of the load on the graduated scale, and an arresting member fixed relative to the frame and removably engaged by the pointer arm so as to rigidly lock said weighing device including said platform in the zero or initial position.

6. In combination with a wheel-barrow consisting of a frame, legs on said frame, a stop member and a graduated scale on one of said legs, a wheel at one end of said frame and handles at the other end thereof; a barrow load box above the frame, a weighing device comprising a pair of cam disks pivotally mounted in said frame and supporting the load box of the barrow, springs acting on said cam disks and connected to said frame to counterbalance the weight of the load box, a pointer connected with one of the disks to indicate the weight of the load on said scale and to be moved underneath said stop member when depressed into its zero position, whereby the weighing device including said load box is arrested.

7. In combination with a wheel-barrow consisting of a frame, a load box, a wheel at one end of said frame and handles and supporting legs having a graduated scale thereon at the other end thereof; a weighing device comprising a pair of cam disks, a pair of levers, a pair of rods, a pointer pedal connected to one of said cam disks, springs acting on said cam disks and connected to said frame to counterbalance the weight of the load box, said cam disks and levers being pivotally mounted in said frame, said cam disks being arranged approximately right beneath the center of gravity of said load box and supporting the box on the frame, said levers being arranged at the rear beneath said load box and supporting the rear end of the box, each of said rods pivotally connecting one of said cam disks with one of said levers in such manner that said levers and said cam disks swing positively at the same time when the load box is loaded, said pointer pedal indicating the weight of the load on said scale, and an arresting member on one of the legs for releasable engagement with the pointer pedal so as to rigidly lock said weighing device including said load box in the zero or initial position.

8. In combination with a wheel-barrow consisting of a frame, a load box, a wheel at one end of said frame and barrow shafts at the other end thereof, handles at the free ends of said shafts displaceable in the longitudinal direction thereof; supporting legs connected with the frame, a scale on one of the legs; a weighing device comprising a pair of disks pivotally mounted in said frame and supporting said load box, springs connected with said disks and located in said shafts, a pointer pedal connected to one of said disks, said springs having one of their ends attached to said handles, said pointer pedal indicating the weight of the load on said scale, and an arresting member fixed relative to the frame for releasable engagement with the pointer pedal so as to rigidly lock said weighing device including said load box in the zero or initial position.

CARL OVE BULL.

REFERENCES CITED

The following references are of record in the file of this patent:

UNITED STATES PATENTS

| Number | Name | Date |
|---|---|---|
| 596,760 | Ozias | Jan. 4, 1898 |
| 630,765 | Banks | Aug. 8, 1899 |
| 656,717 | Emery, Jr. | Aug. 28, 1900 |
| 1,239,457 | Buschman | Sept. 11, 1917 |